United States Patent
Johne

(10) Patent No.: US 6,974,285 B2
(45) Date of Patent: Dec. 13, 2005

(54) FINE DRILL HEAD WITH SLACK-FREE RADIAL DISPLACEMENT

(75) Inventor: Frank Johne, Grossenhain-Zschauitz (DE)

(73) Assignee: Johne & Co Präzisionswerkzeuge GmbH, Dorsten (DE)

( * ) Notice: Subject to any disclaimer, the term of this patent is extended or adjusted under 35 U.S.C. 154(b) by 0 days.

(21) Appl. No.: 10/468,225

(22) PCT Filed: Feb. 15, 2002

(86) PCT No.: PCT/DE02/00546

§ 371 (c)(1),
(2), (4) Date: Sep. 12, 2003

(87) PCT Pub. No.: WO02/064294

PCT Pub. Date: Aug. 22, 2002

(65) Prior Publication Data

US 2004/0096285 A1    May 20, 2004

(30) Foreign Application Priority Data

Feb. 15, 2001 (DE) ............................. 101 08 794

(51) Int. Cl.[7] ............................................. B23B 51/00
(52) U.S. Cl. ....................... 408/156; 408/154; 408/181
(58) Field of Search ............................. 408/156, 154, 408/181; 82/158; 407/44, 45

(56) References Cited

U.S. PATENT DOCUMENTS

| | | | |
|---|---|---|---|
| 3,144,792 A | * | 8/1964 | Marchis ...................... 408/181 |
| 3,625,625 A | | 12/1971 | Van Roojen et al. |
| 3,856,428 A | * | 12/1974 | Eversole ...................... 408/240 |
| 4,018,542 A | * | 4/1977 | Lindsay ....................... 408/153 |
| 4,163,624 A | * | 8/1979 | Eckle .......................... 408/185 |
| 4,780,029 A | * | 10/1988 | Beck ............................ 407/89 |
| 4,933,868 A | | 6/1990 | McMurtry |
| 5,709,510 A | * | 1/1998 | Scheer ........................ 408/156 |
| 2003/0002939 A1 | * | 1/2003 | Tugend et al. .............. 408/181 |

FOREIGN PATENT DOCUMENTS

| | | | | |
|---|---|---|---|---|
| DE | 33 32 243 A1 | | 3/1985 | |
| DE | 3508434 A1 | * | 9/1985 | ........... B23B 27/16 |
| DE | 39 26 026 | | 2/1991 | |
| EP | 0 251 405 A1 | | 6/1986 | |
| JP | 02088108 A | * | 3/1990 | ......... B23B 29/034 |
| WO | WO 9402275 A1 | * | 2/1994 | ......... B23B 29/034 |

* cited by examiner

Primary Examiner—Derris H. Banks
Assistant Examiner—J Williams
(74) Attorney, Agent, or Firm—Cohen, Pontani, Lieberman & Pavane

(57) ABSTRACT

The invention relates to a tool head, especially a fine drill head, comprising a machine shank and a tool shank having a joint center axis, wherein the tool shank has a rigid core and a head with a tool, supported by a parallel spring arrangement and is able to be elastically displaced in relation thereto, said head having several limbs which emanate therefrom and form the parallel spring arrangement, whereby at least one of said limbs is fixed to the core or machine shank. The inventive tool head also comprises a device for radial displacement of the head in relation to the core, comprising a positioning device which has a conical part and is guided inside the core. The conical part bears against a contact part of the parallel spring arrangement under pressure when in use. The core is configured with the parallel spring arrangement in a single piece.

16 Claims, 4 Drawing Sheets

FINE DRILL HEAD WITH SLACK-FREE RADIAL DISPLACEMENT

PRIORITY CLAIM

This is a U.S. national stage of application No. PCT/DE02/00546, filed on 15 Feb. 2002. Priority is claimed on that application and on the following application(s): Country: Germany, Application No.: 101 08 794.2, Filed: 15 Feb. 2001.

BACKGROUND OF THE INVENTION

1. Field of the Invention

The invention relates to a tool head, in particular a precision boring head, having a machine shank and a tool shank which have a common mid-axis, the tool shank having a core and a head which is borne by a parallel spring arrangement that can be deflected resiliently in relation thereto and has a tool, in particular a head with a plurality of legs which originate from said head and form a parallel spring arrangement, of which at least one leg is fixed to the core or machine shank, and to a device for the radial adjustment of the head relative to the core.

2. Description of the Prior Art

A boring head of the generic type is disclosed by DE 33 32 243 A1. In this boring head, a spring-loaded, long pin with a head in the shape of a truncated cone is guided in the axial direction in its tool shank and can be adjusted in the axial direction. By means of axial displacement of the truncated cone-shaped pin which, for its part, presses against a bolt arranged in the head of the parallel spring arrangement, the tool in the head has impressed on it a slight radial movement corresponding to the pitch of the conical surface, and thus the tool is adjusted radially outward or inward. This device has been tried and tested in practice, but the tool head is relatively long and the tool-cutter holder is fixed in its position only by surface friction. In addition, this tool has very many parts and is therefore relatively expensive, and the tool must be implemented in cooperation with the machine manufacturer, because of the adjusting device being driven by signals from the machine. A further disadvantage resides in the fact that, because of the design, the coolant flows through the adjustment region of the setting device and therefore the setting device cannot always be set under the same conditions, because of contamination by coolant.

DE 39 26 026 A1 discloses a tool head of similar type, in which a parallel spring arrangement can be deflected resiliently against a base body. The tool is held in the parallel spring arrangement and can be adjusted radially by means of a device comprising a setting screw with a conical part, which bears with prestress against a complementary surface on the parallel spring arrangement. The disadvantage is that this device can be used only for a specific tool design, a long chisel, since, with this chisel, at the same time an imbalance compensating device is intended to be actuated in reverse, in order that highly accurate boring can be achieved with tools of this type. A further disadvantage consists in the fact that the tool cannot be preset and coolant flows through the setting region in which the setting screw is located, and through the imbalance compensating device.

SUMMARY OF THE INVENTION

On this basis, the invention is based on the problem of avoiding the disadvantages of the prior art, but using its advantages, of being small with few device parts and of arranging these parts in such a way that space remains for leading the coolant duct through as far as the tool. The intention is for minimal, radial setting to be possible under control with exact fixing of the setting position. Further problems associated with the use of a tool head of this type, which the invention deals with, emerge from the respective explanation of the solution indicated.

The first solution in the case of the generic tool head is to form the core and the parallel spring arrangement together in one piece. The necessary division of the parallel spring arrangement from the core can be carried out by methods which are familiar nowadays, by means of drillings and erosion tools which are to be used in order to produce a narrow groove for the mobility of the parallel spring on the core. This arrangement is conceived in particular for tools of small diameter, in which extremely precise adjustments in the radial direction is required. In the case of the tool according to the invention, the adjustment can be carried out in the range of 1 μm in the radial direction, that is to say 2 μm bore diameter. In a particularly preferred embodiment, the head for holding the cutter holder or the tool holder is also arranged in one piece with the parallel spring, so that neither play nor undesired mispositioning of the head on the parallel spring arrangement can occur.

A second solution of the problem according to the invention provides for the contact part to be a positionable, presettable screw with an arm of the parallel spring arrangement, the arm extending back from the head in the direction of the machine head and, on the opposite side, in the core, for the setting device to be screwed into the core, transversely with respect to the mid-axis, as a setting screw. An extremely compact tool is therefore made possible, which the edges of the parallel spring arrangement did not permit the hitherto, since they were arranged in a separate part of the spring.

As is known per se, the setting screw is provided with a conical surface or a conical part which bears under prestress on an opposing part, an abutment according to the prior art or, according to the invention on a specifically formed pressure screw having an end face that is compatible with the conical part.

A tool shank formed in this way still leaves space for a coolant bore which, in the core, is led past the setting device, penetrates the slot and ends in the parallel spring arrangement on the head, the necessary slot between parallel spring arrangement and core being overcome by a hose. Instead of a hose, a similarly flexible element can also be used.

In one embodiment, the cutter holder is formed in such a way that it is arranged in a clamping groove in the tool head, transversely with respect to the mid-axis of the entire tool, so that it is radially adjustable. The cutter holder, which, for example, is provided with a reversible cutting plate, is preferably fixed in at least two axes by appropriate pressure screws. In a preferred embodiment, one of the screws is formed in such a way that it can fix the cutter holder in two axes, specifically in order to absorb forces in the horizontal and axial direction, in that an oblique depression is introduced into the cutter holder, onto which one of the pressure screws is placed and, with an appropriate pressing force, fixes the cutter holder in two axes.

Instead of a cutter holder of this type, provision can also be made for a different cutter holder, for example a long chisel, as known from the prior art, to be fitted to the end face of the head of the tool shank by means of a screw fitting. In this case, the rear face of the cutter holder and the end face are preferably designed to be flat and the cutter holder with the head is screwed firmly by means of a union nut onto the head, which has a thread corresponding thereto. This results in a play-free connection. The cutter holder preferably also has a coolant bore and, via the clamping groove, which in this case is not used, is supplied by the cooling liquid line in the core with generosity, which can then pass through the cutter holder to the tool tip in the bore, in order to provide liquid emerging at the connecting point in the union nut, which is either integrally molded in one piece on the cutter holder or, as a true union nut, engages around the cutter holder and the head at the tool shank, with the appropriate seals, which are compressed by the union nut being screwed on and therefore hold tightly. Such a design of the cutter holder is suitable in particular for small bores which are additionally deep and, in addition, if only one tool head of the type according to the invention is used, a wide range of bores, starting from about 5 mm up to 70 or 80 mm, can be produced. In a special case, the cutter holder itself can also be formed as a borer in order to produce small bores. In this case, however, no radial adjustment is required if the borer is formed as a double cutter.

BRIEF DESCRIPTION OF THE DRAWINGS

The invention is to be explained in more detail by using the drawing of an exemplary embodiment, in which.

DETAILED DESCRIPTION OF THE PRESENTLY PREFERRED EMBODIMENTS

Figure 1:
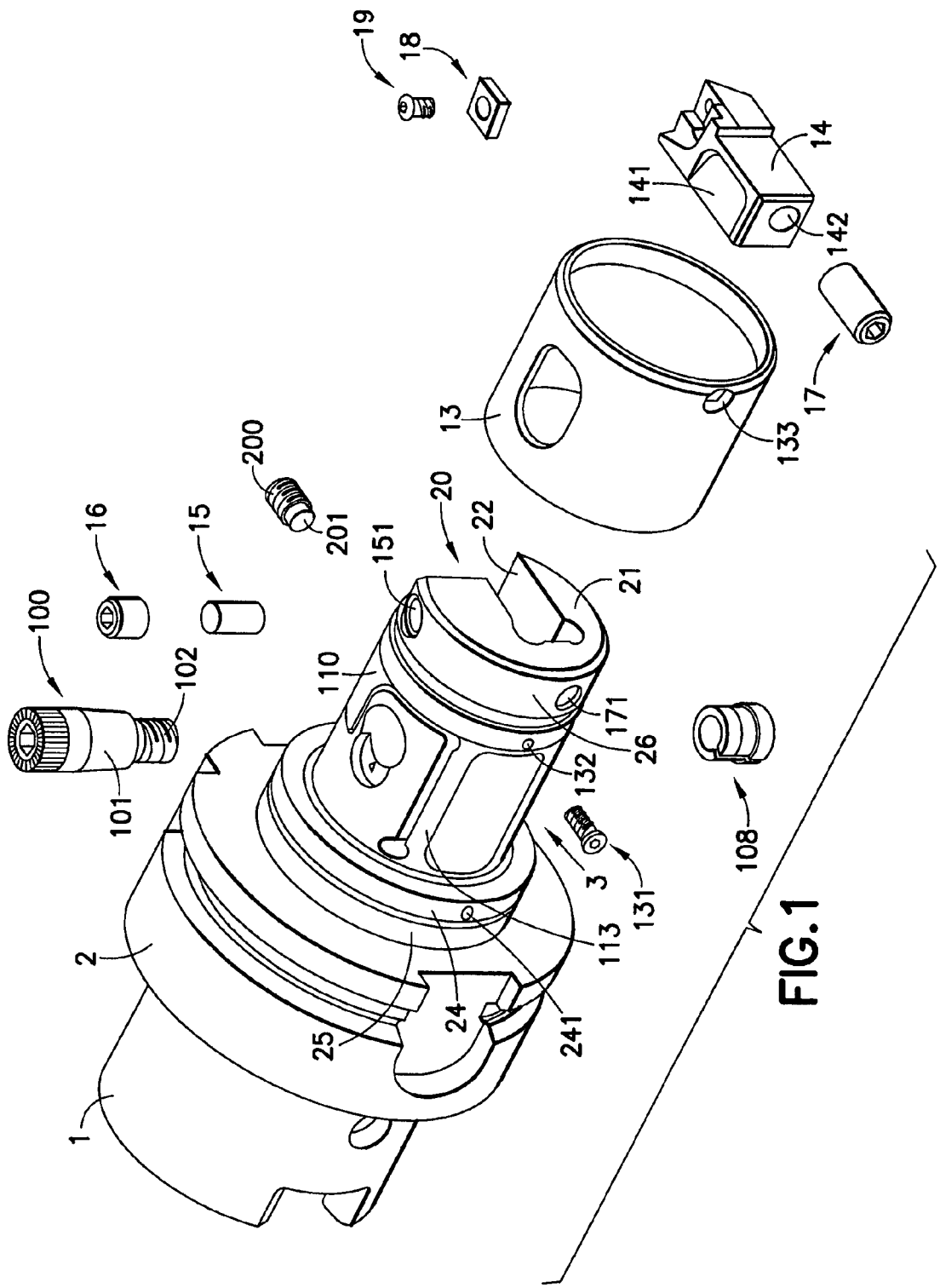
FIG. 1 is an exploded perspective view of the tool head according to the invention.

The drawing shows, partly schematically, a tool, approximately at the original size, for boring out or precision boring a hole with a diameter of about 35 mm. This is only an exemplary embodiment. The practical diameter for tool heads of this size also permits diameters from about 10 mm, in particular if a long chisel is used.

Figure 2:
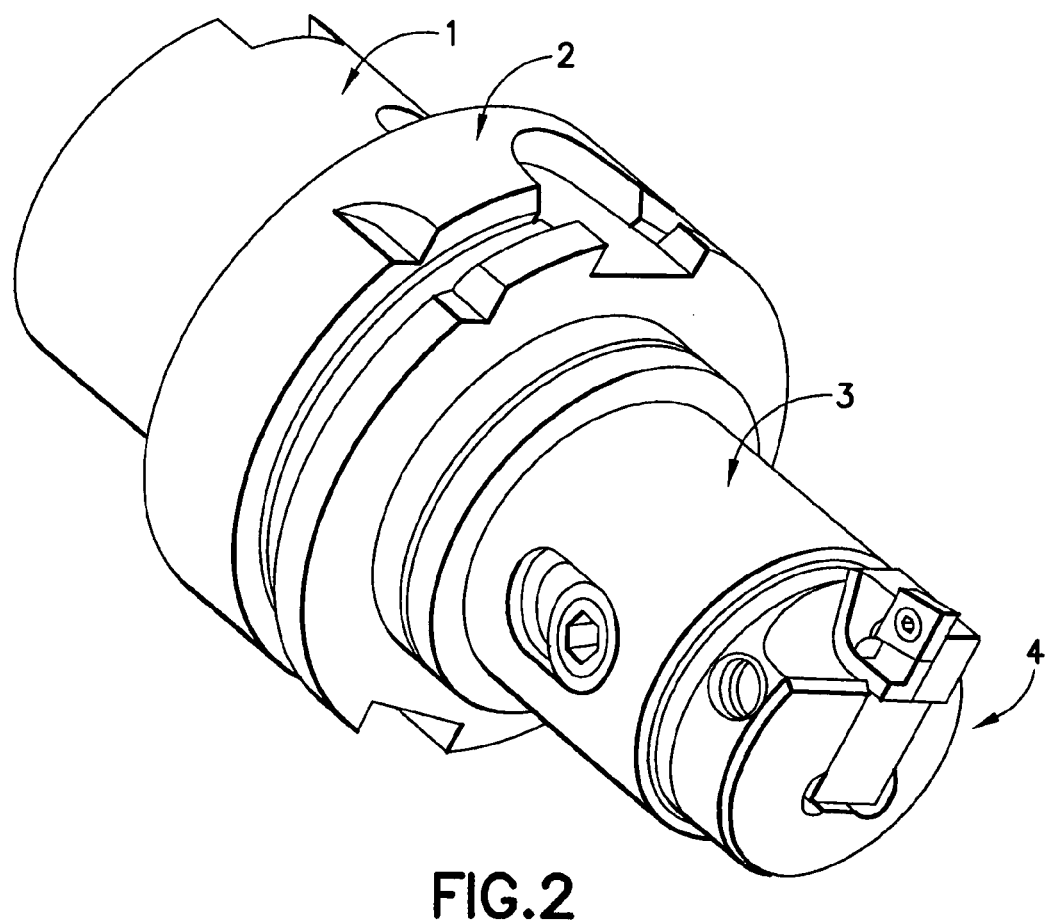
FIG. 2 is a perspective view of the tool head according to the invention following assembly.
Figure 4:
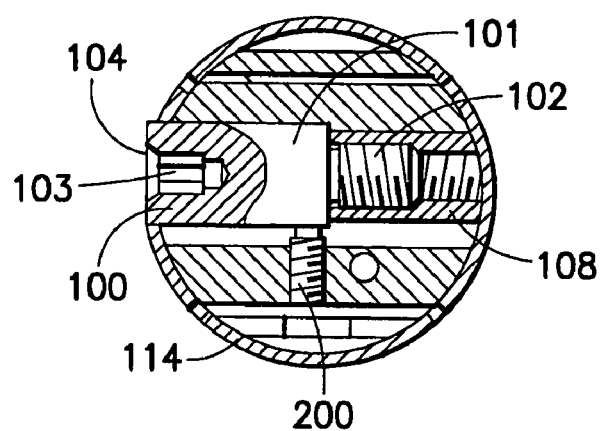
FIG. 4 is a section through the setting device according to the invention according to the section position IV—IV in FIG. 3.
Figure 5:
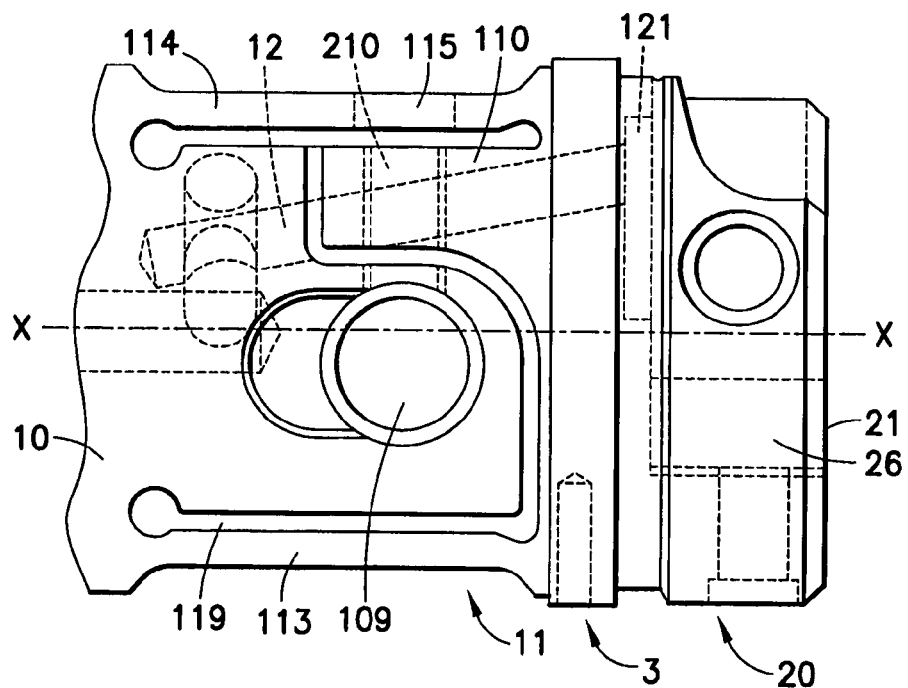
FIG. 5 is an embodiment of the tool shank on its own analogous to FIG. 1.

FIG. 1 shows an exploded illustration of the substantial parts of the tool head or the elements to be assembled on a tool shank, for example according to FIG. 5, and the assembled state of the tool head according to FIG. 1 in FIG. 2. The tool head has a machine shank 1 with any desired holder for a spindle of a machine tool and is provided, for example, with a conventional annular collar 2 for the attachment of a clamping tool (not illustrated) for the tool head in the machine. The tool shank, designated generally by reference number 3, comprises a core 10 (FIG. 5) and a parallel spring arrangement 11 to accommodate a tool holder, 4. In the embodiment of FIG. 1, the tool holder 4 comprises a cutter holder 14, on which, by means of fixing screw 19, a commercially available reversible cutting plate 18 can be fixed. The tool holder further comprises a head 20 with an end face 21 to hold a cutter holder 14, which can slide in a guide groove 22 and can be fixed in its position. This fixing is provided by means of a screw 17, which is introduced into a threaded hole 171 in the head 20 in such a way that, by using the screw 17, pressure can be exerted on that side 142 of the cutter holder 14 which lies opposite the reversible cutting plate 18. In the other axis, orthogonal thereto, the cutter holder 14 is held by a pressure piece 15 by means of clamping screw 16, which can both be inserted through threaded hole 151, the pressure piece 15 coming to bear on the oblique face 141 in the cutter holder 14. By means of the shaping of the depressed face 141, inclined with respect to the surface of the cutter holder 14, the cutter holder is fixed in its position both in the direction of the mid-axis X (FIG. 3) and in a horizontal direction, while it can be positioned in the second horizontal direction by the pressure screw 17 bearing on contact point 142. The cutter holder is pre-positioned for the corresponding diameter with the aid of the outlined pressure screws 16 and 17. The part 20 is the head of the parallel spring arrangement 11, which has spring legs 113, 114 (see FIG. 5), which are connected firmly to the head 20 but permit a resilient radial adjustment of the head 20. For radial adjustment, use is made of a setting device which is arranged between the core 10 and the parallel spring arrangement 11 and is primarily formed of a setting screw 100 (FIG. 4), which has a conical part 101 and a threaded part 102, which can be screwed by means of a tool which is not illustrated but can be inserted into hole 103. On its top face, the screw is provided with a marking 104 which can be read off against a notch 107 arranged on the core 10. The screw 100 is situated in a sleeve 108 fixed in the core 10 and having an internal thread, and in this way can be adjusted transversely with respect to the mid-axis X of the tool head. In this case, the conical part 101 of the screw acts on the actuating face 201 of a screw 200, which is inserted into the abutment part 110 of the head 20, springing back in the direction of the machine shank 1 in the manner of a stiff carrier, so that it can make contact with the screw 100. In order to insert the screw 200, the leg 114 has a hole 115 for the screw 200 to pass through. The screw 200 can be pre-positioned for a specific diameter range to be produced.

In this way, the parallel spring arrangement is imparted a prestress, that is to say it is forced out of the stress-free neutral spring position, and supplied in this way from the factory. The purpose is to permit no change in the diameter when cutting inserts such as cutting plates are used, in which the reaction forces on the cutter to the cutting forces leads to the cutter being "pulled" into the workpiece and therefore the bore becoming larger and impermissibly exceeding tolerances. If the bore which is to be produced with the tool head is to become slightly smaller or larger, then the screw 100 can be screwed more deeply or less deeply into the sleeve 108 and, in the process, forces the outer parallel spring parts to undergo a position change. The screw 200 is seated in an abutment 110 which originates from the head 20, is of cantilevered design and belongs to the parallel spring arrangement 11, and which has a cross-section which is larger than the cross section of the leg parts 113, 114 and itself therefore virtually does not bend resiliently but, with appropriate pressure on the screw 200, deflects the parallel spring and therefore the tool outward. As a result of arranging the conical face 101 on the setting screw 100, fine outward deflection of the parallel spring is thus possible, in the range of an adjustment in radial steps of 1 $\mu$m. Therefore, current accuracy requirements on the bores are satisfied in virtually all cases.

By using a dust cap 13 which, by means of screw 131, can be screwed through a hole 133 in the dust cap 13 into the thread 132 on the head 20, dirt is prevented from getting into the setting area or the region of movement of the parallel spring and impairing the setting of the parallel spring.

Figure 3:
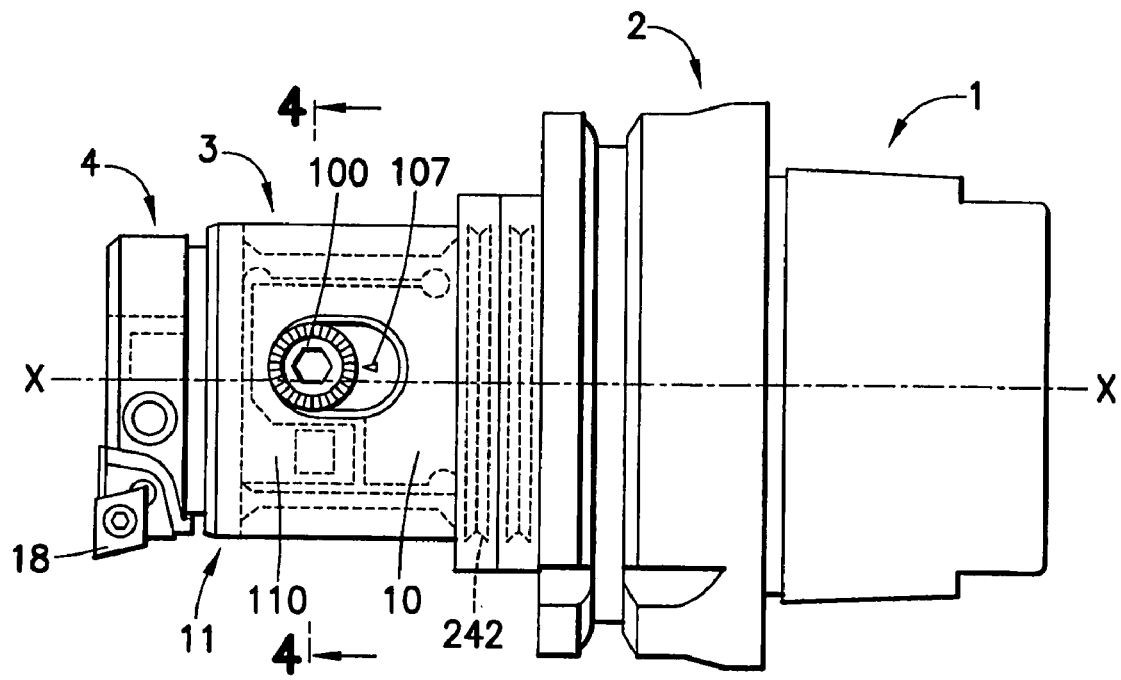
FIG. 3 is a side view of the tool head according to FIG. 2 with a dotted-line representation of the parallel spring arrangement.

In addition, in relation to the machine shank 1 or annular collar 2 in, the tool head 3 is provided in with two or more balancing rings 24, 25 which, in order to compensate for the unequally distributed masses on the tool head, are themselves provided with a recess (not illustrated), which can be positioned in such a way that the imbalance of the tool head is minimized. Following the correct setting, with the aid of a screw through the hole 241, the rings are fixed in their position in a clamping groove 242 on the core 10 or the annular collar 2 (FIG. 3). This tool, equipped in this way, can be operated with extremely high rotational speeds up to about 30 000 revolutions per minute and produce extremely finely toleranced bores.

FIG. 5 shows a tool shank in which the core 10 is formed in one piece with the parallel spring 11. According to FIG. 1, the tool shank 3 is connected to the machine shank 1 or the annular collar by a threaded connection. In FIG. 5, the head 20, which in one embodiment could be screwed on to the parallel spring, is likewise illustrated as a part in one piece with the parallel spring 11. This enlarged situation shows, in a virtually identical design to FIG. 1, that the abutment 110 is arranged overall as an arm springing back toward the machine shank 1 and belonging to the head 20 and therefore the parallel spring 11, and has a threaded hole 210 into which, through an aligned hole 115 in the leg 114 of the parallel spring arrangement 11, the screw 200 (FIGS. 1, 4) can be inserted, meeting a setting screw 100 (FIG. 4) arranged in the threaded hole 109. The groove 119 separates both the legs 113, 114 and the abutment 110 from the core 10, and also the coolant feed 12 in the core 10 from the extension of the coolant bore 12 in the parallel spring arrangement, which has an outlet 121 in the head just underneath the tool, to cool the same. The gap in the coolant line is closed by a flexible line, for example a hose, which is not shown, in order that the coolant can pass unimpeded as far as the head or the working tool.

Figure 6:
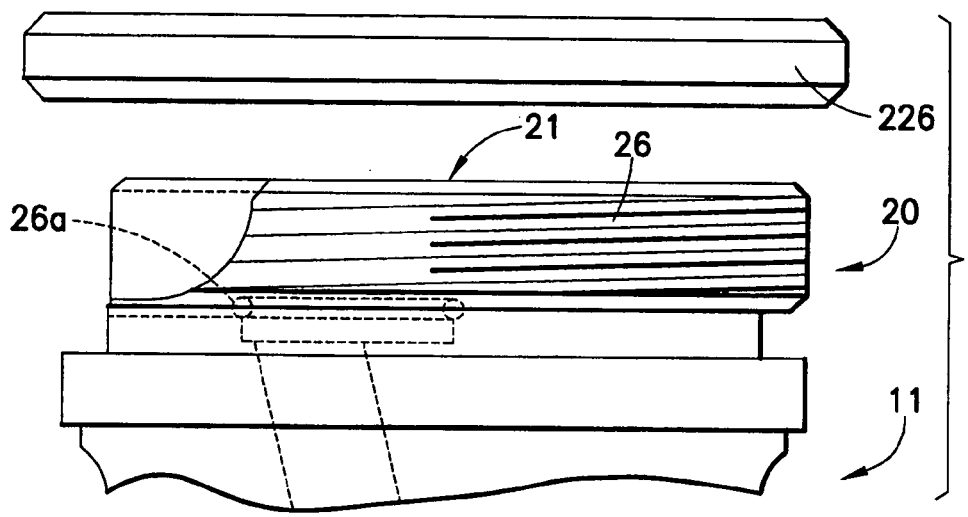
FIG. 6 is a side view of a further embodiment of a tool shank.

The tool shank with head 20 illustrated in FIG. 5 is shown without a tool holder with a tool, for example a reversible cutting plate 18. Instead of receiving tool holder 14, the head 20 may be provided on the collar 26 with a thread, as shown in FIG. 6 which is designed to be complementary to a union nut 226 (shown schematically in FIG. 6). The union nut 226 is preferably coupled in one piece to a cutter holder (not illustrated) which can be placed flat on the front side 21 of the head 20 and at whose tip or outermost end a tool cutting plate can be located. Using such a chisel arrangement, very deep and small bores can be machined. The setting for bores to be toleranced in a corresponding way can, as explained, be made with the screw 200 or setting device 100, as has also been explained using the example of the tool holder 14. The cutter holder of this alternative embodiment may be hollow in order to lead coolant through. The coolant feed 12, coming from the shank, ends on the head 20 in the clamping groove 22, which has no function here and is provided in the union nut 226 with a seal in relation to the head 20. As a result, through the cooling liquid bore 12 and via the clamping groove 22, it is possible to bring coolant into the cutter holder—not illustrated—which extends toward the workpiece approximately on the mid-axis X. The seal 26a can be formed as an O ring, the nut relating to the head or the union nut can be formed as a separate part or else be arranged on the cutter holder. For this purpose, the cutter holder itself is screwed with its rear end flat on the end face 21 of the head 20, so that it has appropriate guidance on the end face 21 and, at the same time, presses the sealing rings, and thus cooling liquid can pass unimpeded to the cutter holder.

What is claimed is:

1. A tool head for precision boring, comprising:
  a machine shank;
  a tool shank connected to the machine shank and having a common longitudinal axis therewith, said tool shank including a core, a parallel spring arrangement resiliently deflectable relative to said core, and a head connected to said core by said parallel spring arrangement, wherein said parallel spring arrangement includes a plurality of legs originating from said head, at least one of said plural legs being connected to one of said core and said machine shank, said core being formed as one piece with said parallel spring arrangement; and
  a device for radial adjustment of said head relative to said core comprising a setting device having a conical portion which bears under a prestress generated by said parallel spring arrangement on a contact portion of said parallel spring arrangement, wherein said contact portion comprises an arm of said parallel spring arrangement with a presettable screw arranged in said arm, said arm extending toward said machine shank, said setting device being threadably inserted into said core transverse to said longitudinal axis of said core.

2. The tool head of claim 1, wherein said presettable screw comprises an end face forming a contact pairing with said conical part of said setting device.

3. The tool head of claim 1, wherein said setting device comprises a head having an outward facing visible portion including a marking to indicate its rotary position relative to said core.

4. A tool head for precision boring, comprising:
  a machine shank;
  a tool shank connected to the machine shank and having a common longitudinal axis therewith, said tool shank including a core, a parallel spring arrangement resiliently deflectable relative to said core, and a head connected to said core by said parallel spring arrangement, wherein said parallel spring arrangement includes a plurality of legs originating from said head, at least one of said plural legs being connected to one of said core and said machine shank, said core being formed as one piece with said parallel spring arrangement, and wherein said head comprises an external thread for threadably receiving a union nut for holding a cutter holder; and
  a device for radial adjustment of said head relative to said core comprising a setting device having a conical portion which bears under a prestress generated by said parallel spring arrangement on a contact portion of said parallel spring arrangement.

5. The tool head of claim 4, wherein said parallel spring arrangement is formed as one piece with said head.

6. The tool head of claim 4, wherein a position of said conical portion of said setting device bearing against said contact portion is adjustable for effecting radial adjustment of said head relative to said core.

7. The tool head of claim 4, further comprising a cooling duct in said core connected to a further cooling duct in said head.

8. The tool head of claim 4, further comprising a tool holder receivable in a groove in said head and pressure screws for at least two-axis fixing of said tool holder in said groove.

9. The tool head of claim 4, further comprising a seal for preventing coolant from exiting a cooling duct in said head.

10. A tool head for precision boring, comprising:
a machine shank;
a tool shank connected to the machine shank and having a common longitudinal axis therewith, said tool shank including a core, a parallel spring arrangement resiliently deflectable relative to said core, and a head connected to said core by said parallel spring arrangement, wherein said parallel spring arrangement includes a plurality of legs originating from said head, at least one of said plural legs being connected to one of said core and said machine shank; and
a device for radial adjustment of said head relative to said core comprising a setting device having a conical portion which bears under a prestress generated by said parallel spring arrangement on a contact portion of said parallel spring arrangement, said contact portion comprising an arm of said parallel spring arrangement with a presettable screw arranged in said arm, said arm extending toward said machine shank, said setting device being threadably inserted into said core transverse to said longitudinal axis of said core.

11. The tool head of claim 10, wherein said presettable screw comprises an end face forming a contact pairing with said conical part of said setting device.

12. The tool head of claim 10, wherein said setting device comprises a head having an outward facing visible portion including a marking to indicate its rotary position relative to said core.

13. The tool head of claim 10, further comprising a cooling duct in said core connected to a further cooling duct in said head.

14. The tool head of claim 10, further comprising a tool holder receivable in a groove in said head and pressure screws for at least two-axis fixing of said tool holder in said groove.

15. The tool head of claim 10, wherein said head comprises an external thread for threadably receiving a union nut for holding a cutter holder.

16. The tool head of claim 15, further comprising a seal for preventing coolant from exiting a cooling duct in said head.

\* \* \* \* \*